Aug. 16, 1927.
E. W. GOESER
DRILL STEM ROLLER DRIVING BUSHING
Filed Sept. 10, 1923
1,639,337
2 Sheets-Sheet 1
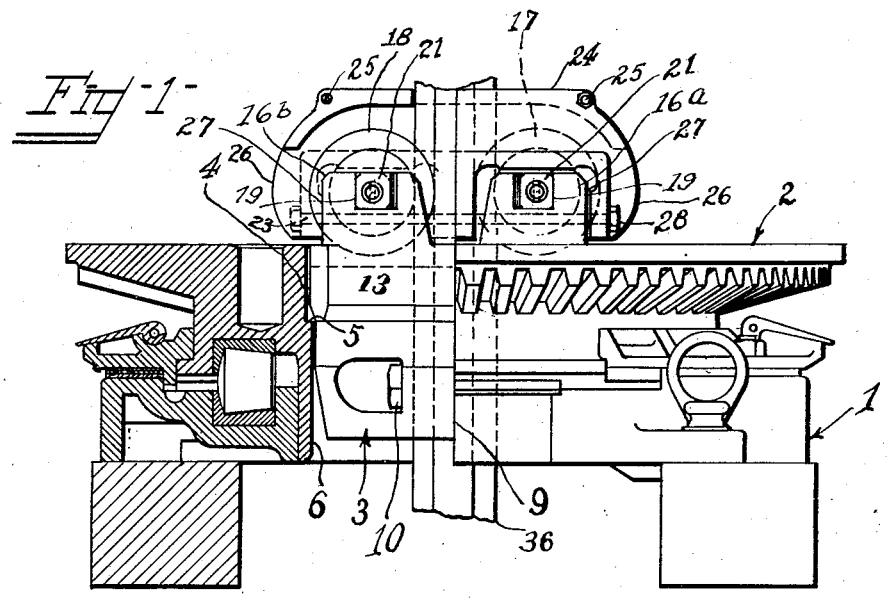
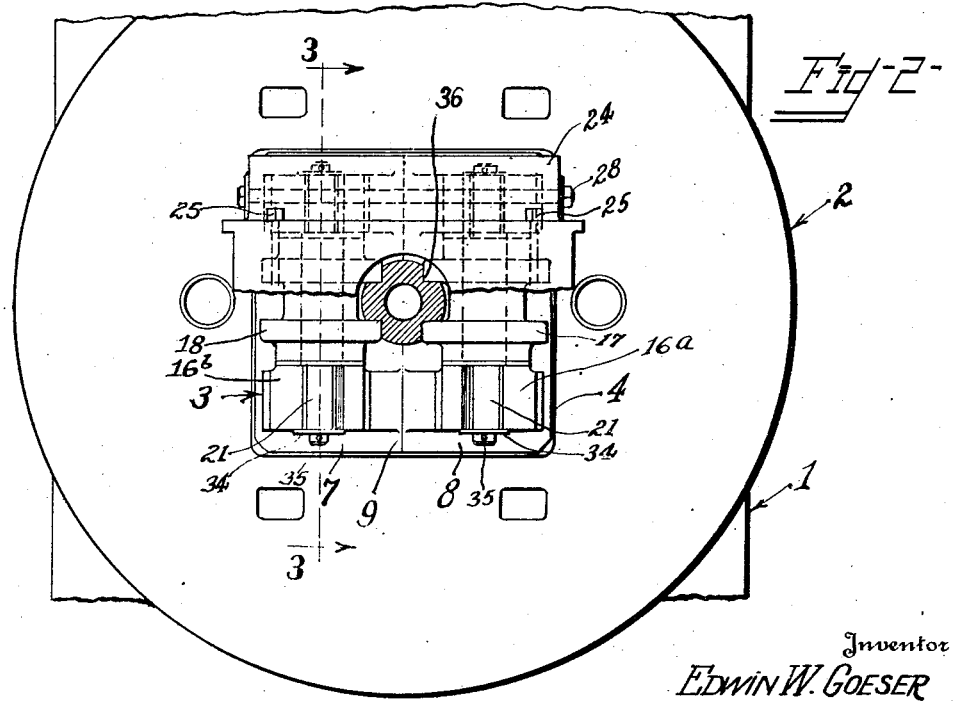
Inventor
EDWIN W. GOESER
By Lyon & Lyon
Attorneys

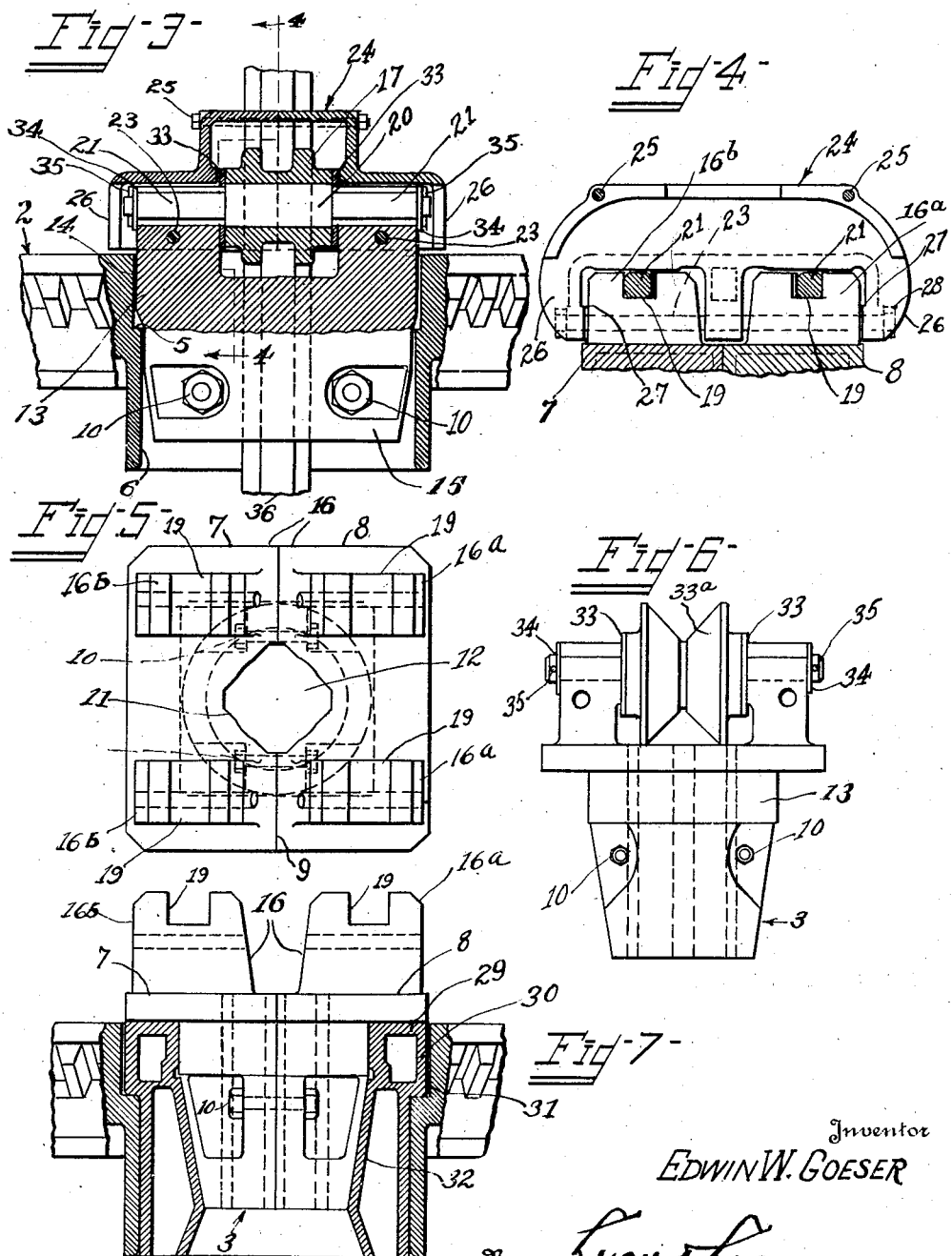

Patented Aug. 16, 1927.

1,639,337

UNITED STATES PATENT OFFICE.

EDWIN W. GOESER, OF LOS ANGELES, CALIFORNIA, ASSIGNOR TO UNION TOOL COMPANY, OF TORRANCE, CALIFORNIA, A CORPORATION OF CALIFORNIA.

DRILL-STEM ROLLER DRIVING BUSHING.

Application filed September 10, 1923. Serial No. 661,863.

This invention relates to driving bushings for rotary drill tables. The general object of the invention is to produce a driving bushing which will operate effectively as a guide for the drill stem in moving up or down through the drill table, without offering substantial resistance to the movement of the drill stem, and through which the rotation of the table can be effectively imparted to the drill stem; one of the objects of the invention is to provide a construction which will prevent dislodgment of the driving bushings by an upward movement of the drill stem. The invention involves the use of rollers for engaging the drill stem, and one of the objects of the invention is to provide simple means for mounting these rollers which will facilitate their alinement with respect to the axis of the drill table, and also to provide a construction for mounting and supporting the same which will readily meet the strains developed in the bushings by the torsion occurring when the table is rotating the drill stem.

Further objects of the invention will appear hereinafter.

The invention consists in the novel parts and combination of parts to be described hereinafter, all of which contribute to produce an efficient drill stem roller driving bushing.

A preferred embodiment of the invention is described in the following specification while the broad scope of the invention is pointed out in the appended claims.

In the drawing:

Figure 1 is a vertical section and partial elevation of a rotary table embodying my invention; this view indicates a portion of a drill stem extending through the table and broken away.

Fig. 2 is a plan of the table shown in Figure 1 and showing the drill stem in cross section. This view is partially broken away.

Fig. 3 is a vertical section through the driving bushing taken about on the line 3—3 of Figure 2, partially broken away and showing portions of the table in section and in elevation.

Fig. 4 is a section taken about on the line 4—4 of Figure 3, the lower portion of the view being broken away.

Fig. 5 is a plan of the bushing with the rollers and the drill stem removed.

Fig. 6 is a side elevation of the bushing removed from the table and with the rollers in place.

Fig. 7 is a vertical section through the drill table, broken away and showing a portion of the drill table in elevation.

In practicing my invention I provide a rotary drill table with rollers supporting the table in position to engage the drill stem so that when the table is rotated the rollers impart the rotary movement of the table to the drill stem. This movement, of course, is imparted without any rotation of the rollers except such rotation as would be incidental to an up or down movement of the drill stem through the drill table. In other words the axes of rotation of the rollers are located in a substantially horizontal plane. These rollers are preferably two in number and located diametrically opposite to each other with respect to the vertical axis of the table.

The rollers may of course be secured directly to the rotary table, but are preferably mounted on a bushing which is removably supported in the opening of the table. If the bushing is sufficiently large it may be supported directly in the table opening, but where the bushing is small it may be advisable to provide a table bushing or liner for the table which supports my driving bushing.

In the embodiment of the invention illustrated 1 represents a table base which supports a rotary table 2 of the usual construction, see Figure 1. This view illustrates my bushing 3 supported directly in the angular opening 4 of the table. This angular opening 4 is usually square and provides a shoulder 5 below the level of the upper face of the table, and below which the table presents a cylindrical neck 6.

The bushing 3 is preferably constructed of sections. In the present instance there are two of these sections indicated by the numerals 7 and 8, that is to say, the bushing is divided on the diametrical line 9 into two parts which are secured together by means of bolts 10, see Figures 1 and 5. The adjacent faces of these bushings have V-shaped recesses or notches 11 so that when the bushing sections come together they form a square opening 12 which is sufficiently large to permit a square drill stem, or a flutted drill stem, to pass freely through the bushing. The upper portion of this bushing is formed into an angular or square neck 13 which fits into the angular opening 14 in the table, see Figure 3, and the lower end 15 of the bushing may be slightly tapered, if desired, to facilitate its passage into the cylindrical neck 6 of the table.

In order to mount the driving rollers on the bushing, I provide the upper face of the bushing with lugs indicated collectively by the numeral 16, and these lugs are preferably disposed in pairs, one pair of lugs being indicated by the reference numeral 16ª, and the other pair by the reference numeral 16ᵇ. The two lugs 16ª support the rollers 17, and the other two lugs support an opposite roller 18. The faces of these rollers have any desired configuration, enabling them to engage the side face of a stem of any cross section so as to hold the same against relative rotation. For example, in Figure 2 the rollers illustrated are of channel form enabling them to cooperate with the fluted stem. If desired, however, the rollers 33ª may be of V-shaped cross section so as to enable them to engage two adjacent longitudinally extending guide faces of a square stem. (See Fig. 6.)

The rollers are preferably supported in sockets 19 which are open on their upper sides, and are simply recesses in the upper faces of the lugs. Each roller is supported on the body or middle portion of its shaft 20 which is of enlarged diameter, see Figure 3, and the ends of the shafts are reduced or cut down to square cross section so as to fit into the square sockets 19 of the lugs. The rollers, of course, are loose on the shafts 20 and rotate freely in a vertical plane, with their faces in contact, or substantially in contact, with the sides of the drill stem.

In order to enable the axes of the shafts 20 to be nicely adjusted to aline the rollers with respect to the vertical axis of the table, the sockets 19 are made of slightly greater width than the square necks 21 of the shafts, and this enables me to place shims 22 in the sockets alongside of the squared necks 21, which I utilize to hold the rollers in any alined position desired.

I provide means for preventing any possibility of the torsional strains breaking the bushing sections 7, 8, apart, and for this purpose, at about the level of the rollers 17 and 18, I provide two tie-rods 23 which pass through the lugs in a direction at right angles to the axes of the shafts.

I prefer, however, to provide the bushing with a bonnet or cover 24 which may be formed of two sections divided on a vertical plane extending through the axis of the table and connected together by bolts 25. This cover extends over the squared necks 21 in the sockets 19, and prevents the necks from being dislodged from the sockets. The cover also preferably extends down the sides of the bushing, that is to say, it has downward extensions 26, which fit against seats 27 on opposite sides of the bushing, and the tie bolts 23 pass through these extensions, the nut 28 of each tie bolt being applied so as to seat on the outer side of one of these extensions. In this way the cover operates to assist in resisting the horizontal transverse strains in the bushing, as well as operating to hold the roller shafts in position.

If the bushing is of small size with respect to the drill table, it may be advisable to provide a liner or master bushing, such as the bushing 29, shown in Figure 7, which is formed with a square neck 30 to be received in the square opening 31 in the table, and this bushing may have a tapered neck 32 to receive the tapered portion of my bushing.

On each side of each roller, I provide a steel washer 33, and each of these steel washers has a square opening which receives the squared neck 21 of the shaft. This prevents the washer from rotating and throws all the wear onto the end of the roller, instead of onto the face of the lug.

In order to prevent the shims from working out of the sockets, I provide the end of each squared neck or shank 21 with a square washer 34 which is held in place by a split pin 35. By reason of the square form of this washer 34, its upper edge will engage the under face of the cover.

In using the bushings, it will be evident that the rollers permit a free up and down movement of the drill stem 36 without imparting any strain whatever to the bushing. When the table rotates, its rotary movement is imparted through the rollers to the drill stem.

In pulling the drill string, the collar near the bit will engage the lower end of the bushing and raise it out of its opening or socket in the table, after which regular bushings and pipe slips may be placed in the table to be used in the ordinary way.

It is to be understood that the embodiment of the invention described herein is only one of the many embodiments this invention may take, and I do not wish to be limited in the practice of my invention nor in my claims to the particular embodiment set forth.

What I claim is:

1. In a rotary drill table construction, the combination of a rotary table having an opening therein through which the drill stem passes, a bushing carried in the said opening, said bushing having a pair of sockets open on their upper sides and disposed on opposite sides of the axis of the table respectively, a shaft with a roller between each pair of sockets and seating in the sockets from above for engaging the side of the drill stem to rotate the same, and a cover secured to the bushing and extending over the sockets operating to hold the roller shafts within the same.

2. In a rotary drill table construction, the combination of a rotary table having an opening therein through which the drill stem passes, a bushing carried in the opening, a pair of rollers supported on the bushing, oppositely disposed for engaging the drill stem, a cover extending over the bushing and engaging the sides thereof, tie-bolts passing through the bushing and through the cover near the level of the rollers and extending at right angles to the axes of the rollers.

Signed at Torrance, Calif., this 30 day of August, 1923.

EDWIN W. GOESER.